US009261935B2

(12) United States Patent
Branover et al.

(10) Patent No.: US 9,261,935 B2
(45) Date of Patent: Feb. 16, 2016

(54) ALLOCATING POWER TO COMPUTE UNITS BASED ON ENERGY EFFICIENCY

(71) Applicant: Advanced Micro Devices, Inc., Sunnyvale, CA (US)

(72) Inventors: Alexander J. Branover, Chestnut Hill, MA (US); Ashish Jain, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 304 days.

(21) Appl. No.: 13/932,697

(22) Filed: Jul. 1, 2013

(65) Prior Publication Data

US 2015/0006925 A1    Jan. 1, 2015

(51) Int. Cl.
*G06F 1/20*    (2006.01)
*G06F 1/32*    (2006.01)
(52) U.S. Cl.
CPC .............. *G06F 1/3206* (2013.01); *G06F 1/206* (2013.01); *G06F 1/3287* (2013.01)

(58) Field of Classification Search
CPC ...................................................... G06F 1/206
See application file for complete search history.

(56) References Cited

U.S. PATENT DOCUMENTS

| 2004/0215987 | A1* | 10/2004 | Farkas et al. ................. 713/300 |
| 2009/0254909 | A1* | 10/2009 | Hanson et al. ................ 718/102 |
| 2012/0173895 | A1* | 7/2012 | Kim et al. ..................... 713/300 |
| 2013/0132972 | A1* | 5/2013 | Sur et al. ....................... 718/105 |

* cited by examiner

*Primary Examiner* — Albert Wang

(57) ABSTRACT

A method is provided for allocating power to compute units based on energy efficiency. Some embodiments of the method include allocating portions of a power budget of a system-on-a-chip (SOC) to a plurality of compute units implemented on the SOC based on ratios of a performance level for each compute unit to a power consumed by the compute unit operating at the performance level. An SOC is provided that includes a plurality of compute units and a power management controller to allocate portions of a power budget of the SOC to the plurality of compute units based on ratios of a performance level for each compute unit to a power consumed by the compute unit operating at the performance level.

16 Claims, 6 Drawing Sheets

| CU PRIORITY LIST 200 | | |
|---|---|---|
| CPU PROCESSOR CORE 106 | 1 | |
| GPU 115 | 2 | |
| CPU PROCESSOR CORE 108 | 3 | |
| CPU PROCESSOR CORE 109 | 4 | |
| CPU PROCESSOR CORE 107 | 5 | |
| | ... | |

FIG. 2

ALLOCATING POWER TO COMPUTE UNITS BASED ON ENERGY EFFICIENCY

BACKGROUND

1. Field of the Disclosure

This application relates generally to processing systems, and, more particularly, to power management in a processing system.

2. Description of the Related Art

A conventional system on a chip (SOC) may include multiple processing devices such as a central processing unit (CPU) and a graphics processing unit (GPU). Many CPU and GPU designs include multiple processor cores that can process instructions independently, concurrently, or in parallel. The CPU, the GPU, the processor cores, and/or other entities that are capable of processing operations or instructions may he referred to as compute units. The total amount of power allocated to the SOC is referred to as a power budget of the SOC. The power budget for the SOC is determined, at least in part, by the thermal design of the cooling system that attempts to maintain the temperature of the SOC below a maximum temperature. Exceeding the maximum temperature for an extended period of time may risk damaging the CPU, the GPU, the processor cores, or other logical entities on the SOC.

BRIEF DESCRIPTION OF THE DRAWINGS

FIG. 2 shows an example of a data structure that includes a compute unit (CU) priority list, according to some embodiments.

DETAILED DESCRIPTION

Figure 1:
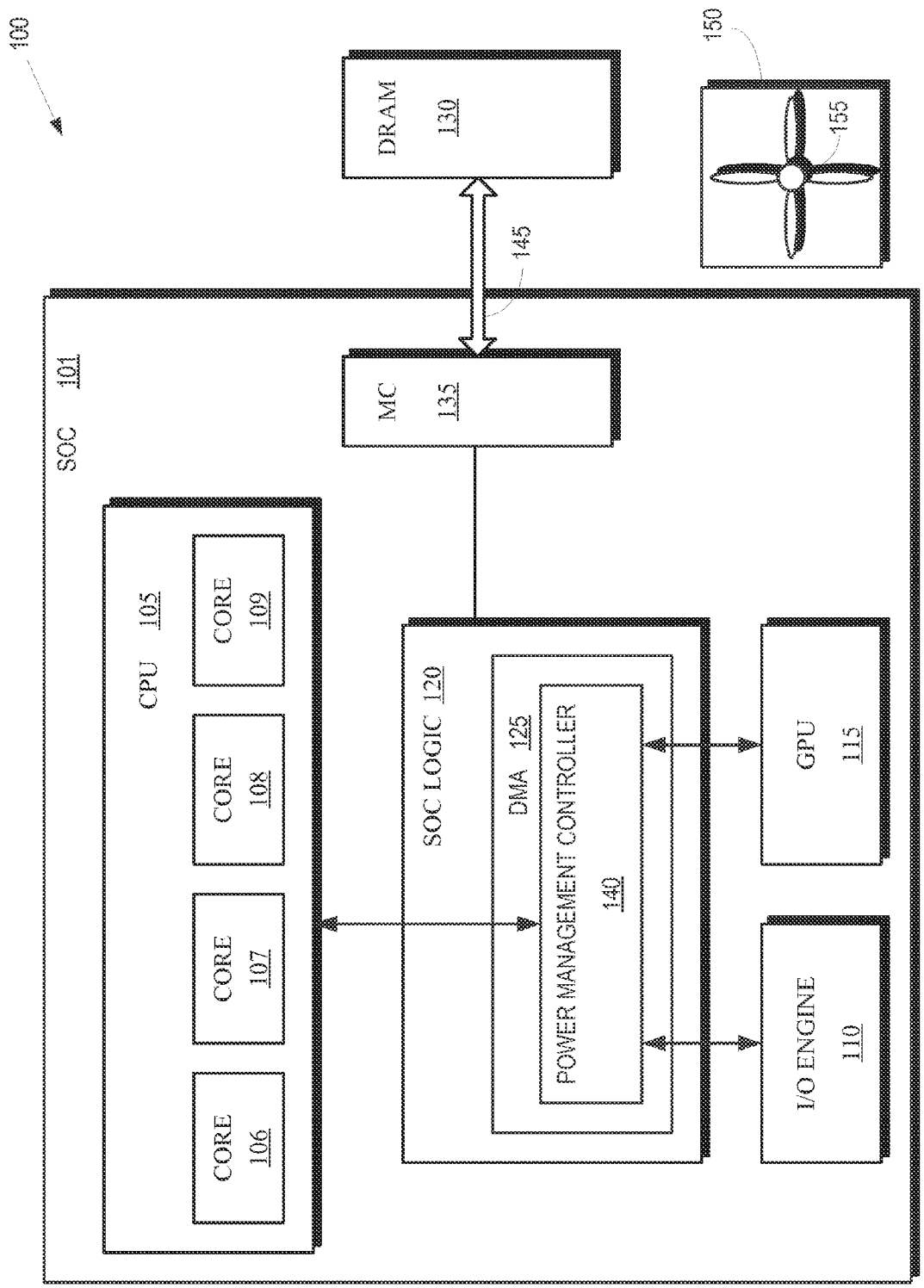
FIG. 1 is a block diagram of a processing system that includes a system-on-a-chip (SOC), according to some embodiments.

Power is allocated from the power budget to compute units of a system-on-a-chip (SOC) based on different performance scenarios. One criteria for allocating power to the compute units in the SOC is that the total power consumed by the compute units should not exceed a predetermined level (e.g., the power consumed should not lead to a power overage) nor should be power consumption lead to overheating of the SOC (e.g., the power consumed should not lead to a temperature overage). The predetermined level that indicates a power overage may be selected to prevent a temperature overage. If some components of the SOC are consuming less than their power allocation, the available power (e.g., the difference between the power consumed by the component and the power allocated to the component) can be re-allocated to other components of the SOC. For example, if a GPU is using less than its power allocation during a compute-intensive scenario, the available power can be allocated to the CPU to increase performance of the CPU. However, the current power consumption of some components may not be known. Instead, the SOC may use an assumed power consumption for these components that is typically set at a high level to provide a guard band against potential power or temperature overages, thereby reducing the power that may be available for re-direction to other components. For example, assuming that the power consumption of a component is at a level above a typical power consumption may reduce the probability that the total power consumption of the SOC exceeds a level that causes a temperature overage when the actual power consumption of the component exceeds its typical power consumption.

Exceeding the maximum temperature for an SOC risks damaging the SOC or components such as the compute units within the SOC. Components in the SOC may therefore be throttled in the event of a temperature overage or a power overage. For example, if a temperature measured in the SOC exceeds the maximum temperature, the CPU, the GPU, the processor cores, or other logical entities on the SOC may be throttled to a lower performance state to reduce the power consumption of the SOC until the temperature of the SOC falls below a threshold value. A conventional SOC treats every compute engine as an independent entity and independently controls the power and temperature of the CPU, the GPU, the processor cores, and other logical entities on the SOC. However, there are non-trivial dependencies between the power levels and temperatures of the CPU, the GPU, and the other logical entities on the SOC and the dependencies are not considered when different components are independently controlled. Furthermore, software control is only able to adjust the state of the components on a relatively long timescale, e.g., tens of milliseconds in Microsoft Windows®. Invoking the software more frequently leads to additional computing overhead that reduces the performance of the SOC.

FIGS. 1-4 describe embodiments of a power management controller that can monitor power consumed by each compute unit (CU) in the SOC. In some embodiments, the CUs include the CPU, the GPU, and other components of the SOC. The CUs may also include processor cores within a multi-core CPU or GPU. The energy efficiency of the CUs can be determined based on the tracked power consumption and the performance level of the CU while consuming this amount of power. The CUs may then be prioritized based upon their energy efficiency. For example, each CU may be given a priority based upon their measured performance per watt so that CUs operating at relatively high performance/watt values are given relatively high priorities and CUs operating at relatively low performance/watt values are given relatively low priorities. The power management controller then allocates power from the power budget to the CUs based on the priority assigned to the CU. For example, higher priority CUs may be allocated larger percentages of the power budget and lower priority CUs may be allocated lower percentages of the power budget. The power management controller may also throttle CUs, e.g., in the event of a power overage or temperature overage, based on the priorities assigned to the CUs. For example, one or more lower priority CUs may be throttled in the event of an overage while one or more higher priority CUs continue to operate normally.

Tracking the power consumption of individual CUs allows the power consumption guard band to be reduced or eliminated, thereby increasing the power that may be available for re-direction to other components. Furthermore, the power management controller can use the power consumption information and performance information for each CU to coordinate the power control of the different CUs and account for the power and temperature dependencies between the different CUs. Directing a larger portion of the power budget to higher efficiency CUs and preferentially throttling low efficiency CUs in the event of temperature overages or power overages can improve the overall performance of the SOC.

FIG. 1 is a block diagram of a processing system 100 that includes a system-on-a-chip (SOC) 101, according to some embodiments. The SOC 101 includes a central processing unit (CPU) 105 for executing instructions. Some embodiments of the CPU 105 include multiple processor cores 106-109 that can independently execute instructions concurrently or in parallel. The CPU 105 shown in FIG. 1 includes four processor cores 106-109. However, persons of ordinary skill in the art having benefit of the present disclosure should appreciate that the number of processor cores in the CPU 105 is a matter of design choice. Some embodiments of the CPU 105 may include more or fewer than the four processor cores 106-109 shown in FIG. 1. The processing system 100 also includes an input/output engine 110 for handling input or output operations associated with elements of the processing system such as keyboards, mice, printers, external disks, and the like. A graphics processing unit (GPU) 115 is also included in the processing system 100 for creating visual images intended for output to a display. Some embodiments of the GPU 115 may also include multiple processing cores (not shown in FIG. 1).

The processing system 100 shown in FIG. 1 also includes other SOC logic 120. Some embodiments of the SOC logic 120 include direct memory access (DMA) logic 125 for generating addresses and initiating memory read or write cycles. The CPU 105 may initiate transfers between memory elements in the processing system 100 such as DRAM memory 130 and/or entities connected to the DMA logic 125 including the CPU 105, the I/O engine 110, and the GPU 115. Some embodiments of the DMA logic 125 may also be used for memory-to-memory data transfer or transferring data between the cores 106-109. The CPU 105 can perform other operations concurrently with the data transfers being performed by the DMA logic 125 which may provide an interrupt to the CPU 105 to indicate that the transfer is complete. The SOC logic 120 may also include routing logic, coherency logic, or logic to implement other functionality.

A memory controller (MC) 135 may be used to coordinate the flow of data between the DMA logic 125 and the DRAM 130. The memory controller 135 includes logic used to control reading information from the DRAM 130 and writing information to the DRAM 130. The memory controller 135 may also include refresh logic that is used to periodically re-write information to the DRAM 130 so that information in the memory cells of the DRAM 130 is retained. Some embodiments of the DRAM 130 may be double data rate (DDR) DRAM, in which case the memory controller 135 may be capable of transferring data to and from the DRAM 130 on both the rising and falling edges of a memory clock. The memory controller 135 may control data transfers by issuing commands to the DRAM 130. For example, the memory controller 135 may issue mode register set (MRS) commands to set values of mode registers (not shown) in the DRAM 130 that indicate different functions to be performed by the DRAM 130 such as refreshing, reading, or writing the DRAM 130.

A power management controller 140 is implemented in the SOC 101. Some embodiments of the power management controller 140 may be implemented in the DMA logic 125. However, persons of ordinary skill in the art having benefit of the present disclosure should appreciate that embodiments of the power management controller 140 may also be implemented in other locations on the SOC 101 or may be implemented in a distributed manner in multiple locations on the SOC 101 using hardware, firmware, or software. The power management controller 140 can measure or access measurements of power consumption by compute units including the CPU 105, the processor cores 106-109, or the GPU 115. The power management controller 140 can also measure or access measurements of the performance level of the compute units. For example, the power management controller 140 may be able to monitor an activity of a node register in each compute unit and/or monitor a rate of execution or retirement of operations or instructions in the compute units. The energy efficiencies of each of the compute units can then be determined based on the tracked power consumption and the performance level of the compute unit while consuming this amount of power. The energy efficiency may be expressed as a performance/watt value. For example, the energy efficiency of a compute unit may be equal to the number of instructions that are retired per second per watt.

The power management controller 140 allocates the power budget of the SOC 101 to the entities implemented on the SOC 101. For example, the power limit (or thermal design power, TDP) of the SOC 101 may be approximately 25 W, of which twelve watts may be budgeted to the CPU 105 and/or the processor cores 106-109, six watts may be budgeted to the GPU 115, four watts may be budgeted to a physical layer interface 145 between the memory controller 135 and the DRAM 130, and three watts may be budgeted to the SOC logic 120. The compute units in the SOC 101 may then be configured to operate within the budgeted power envelope. For example, an operating frequency or operating voltage of the CPU 105 may be configured so that the CPU 105 consumes less than 12 watts during normal operation. However, in some circumstances the power consumed by one or more of the compute units may exceed the budgeted amount, e.g., if the compute unit is processing an unexpectedly large number of operations or instructions for an unexpectedly long time.

The power management controller 140 may also allocate or modify portions of the power budget based upon the energy efficiency of the compute units. For example, the CPU 105, the processor cores 106-109, and/or the GPU 115 may be assigned priorities based upon their measured performance/watt so that compute units that are operating at relatively high performance/watt values are given relatively high priorities and compute units that are operating at relatively low performance/watt values are given relatively low priorities. In some embodiments, the CPU 105, the processor cores 106-109, and the GPU 115 may be assigned one of a predetermined number of priorities that correspond to different performance/watt values or these entities may be ordered based on their relative priority. A record of the performance/watt values for the corresponding priorities may then be stored in a data structure and updated periodically, at predetermined time intervals, or in response to signals from other entities in the processing system 100.

FIG. 2 shows an example of a data structure that includes a compute unit (CU) priority list 200, according to some embodiments. The priority list 200 includes information identifying compute units such as the cores 106-109 and the GPU 115 shown in FIG. 1. The priority list 200 also includes information identifying the priority assigned to each compute unit. For example, the core 106 is assigned a priority of 1, the GPU 115 is assigned a priority of 2, and so on. However, persons of ordinary skill in the art having benefit of the present disclosure should appreciate that some embodiments may use other techniques for indicating the relative priorities of the compute units. For example, the priority list 200 may be an ordered list and the ordering of the list may indicate the relative priorities of the compute units identified in the list. In this example, the priority list 200 may not include information specifically identifying the priority levels since the relative priorities are indicated by each compute unit's position in the priority list 200.

Referring back to FIG. 1, the power management controller 140 may allocate power from the power budget to the compute units based upon their priorities. For example, using the priority list 200 shown in FIG. 2, the power management controller may allocate a relatively large percentage of the total power budget to the core 106, a lower percentage of the total power budget to the GPU 115, and so on. The allocation of power to the compute units may be modified in response to changes in the relative priority of the different compute units. For example, if the energy efficiency of one or more of the compute units increases or decreases, e.g., in response to changes in the programs or instructions being executed by the compute unit, the compute units may be allocated more (if the energy efficiency increases) or less (if the energy efficiency decreases) of the total die power budget.

The processing device 100 should not be run at temperatures that exceed a maximum temperature because of thermal risks that one or more components within the processing device 100 may be damaged. The processing device 100 therefore includes a cooling system 150. In some embodiments, the cooling system 150 is an active cooling system that includes a fan 155, which may be used to maintain the temperature of the processing system 100 below a predetermined maximum temperature. However, persons of ordinary skill in the art having benefit of the present disclosure should appreciate that some embodiments of the cooling system 150 may include more or fewer active components, passive components such as thermal dissipation structures, or combinations thereof. Portions of the cooling system 150 may also be implemented on the SOC 101 in some embodiments. The temperature of the processing device 100 may be determined in part by the power supplied to components of the processing device 100. The total die power budget for the SOC 101 or the processing device 100 may therefore be determined in part by the amount of heat that can be dissipated by the cooling system 150.

The power management controller 140 may be able to detect power overages and/or temperature overages that may damage the system. A temperature overage may be detected by monitoring temperatures recorded at one or more locations in the SOC 101 or the processing device 100 or by monitoring the power supplied to components in the SOC or the processing device 100. A power overage may be detected by monitoring the power consumed by various entities in the SOC 101. For example, one or more of the compute units in the SOC 101 may consume more than the expected amount of power due to fluctuations in the operating conditions of the compute unit. Consuming the unexpectedly large amount of power may lead to a power overage (e.g., if the power consumed by the compute unit and/or the SOC 101 exceeds a corresponding threshold) or a temperature overage (e.g., if the temperature at one or more locations on the SOC 101 exceeds a corresponding threshold).

If either the temperature or the power exceeds a corresponding threshold, the power management controller 140 may identify an overage and begin throttling the least efficient compute units until the overage is resolved, e.g. by reducing the temperature or power to less than the corresponding threshold. Throttling a compute unit may include reducing its operating frequency and/or operating voltage, throttling the instruction stream, or throttling the pipeline progress in some embodiments. The compute units may be selected for throttling based on their energy efficiencies. For example, one or more lower priority compute units may be throttled in the event of a temperature overage while one or more higher priority compute units continue to operate normally. Once the overage is resolved, the power management controller 140 can restore power to one or more compute units.

Figure 3:
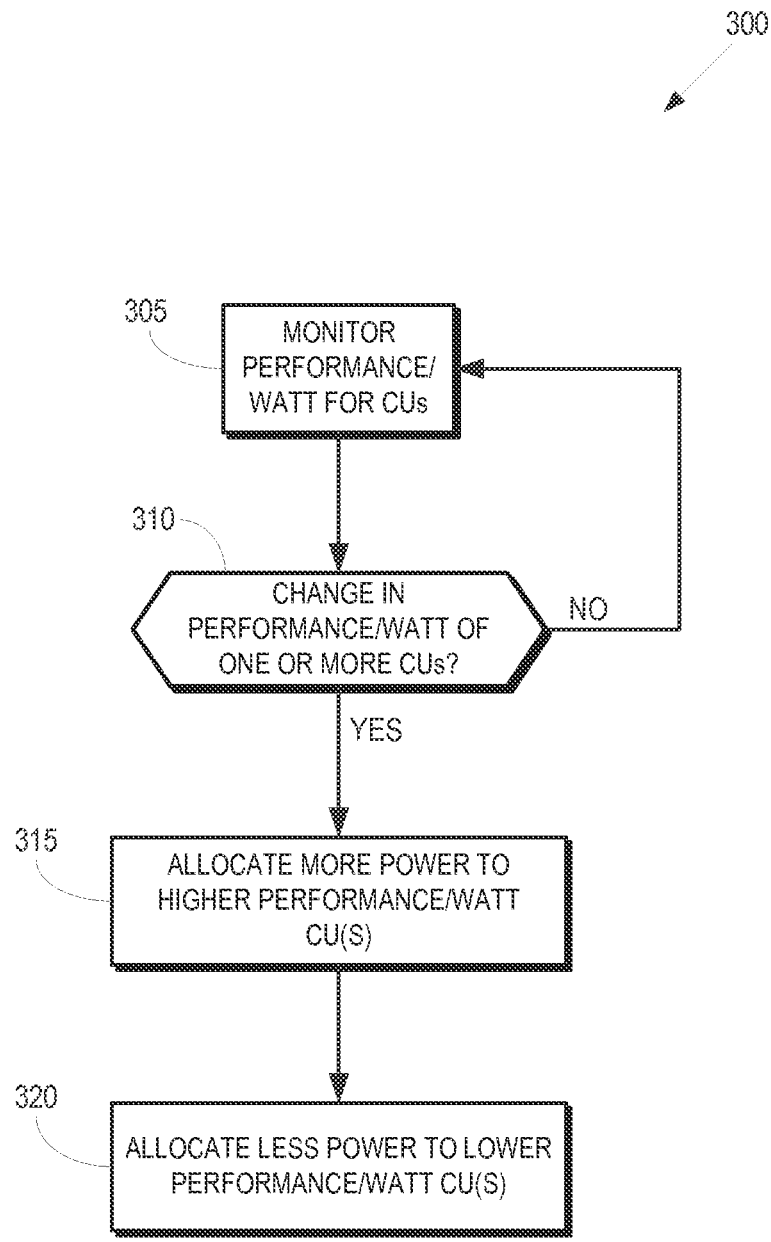
FIG. 3 is a flow diagram of a method of allocating power to compute units (CUs) based on the performance/watt of the CUs, according to some embodiments.

FIG. 3 is a flow diagram of a method 300 of allocating power to compute units (CUs) based on the performance/watt of the CUs, according to some embodiments. The method 300 may be implemented in a power management controller such as the power management controller 140 shown in FIG. 1. At block 305, the power management controller monitors the performance/watt for multiple CUs in a processing device such as the SOC 101 shown in FIG. 1. Monitoring the performance/watt may include measuring performance levels or power consumptions directly or accessing this information from other software, firmware, or hardware. At decision block 310, the power management controller may detect a change in the performance/watt of one or more of the CUs. If not, the power management controller may maintain the current allocation of power to the CUs and continue to monitor the performance/watt at block 305. If the power management controller detects a change in the performance/watt for one or more of the CUs, the power management controller may allocate more power to the CUs that have higher performance/watt at block 315. The CUs that are allocated more power may then operate at a higher frequency and/or voltage. At block 320, the power management controller may allocate less power to the CUs that have a lower performance/watt. The CUs that are allocated less power may then operate at a lower frequency and/or voltage. The power management controller may modify the power allocations at block 315, 320 subject to the constraint that the total allocated power is less than a total power budget.

Figure 4:
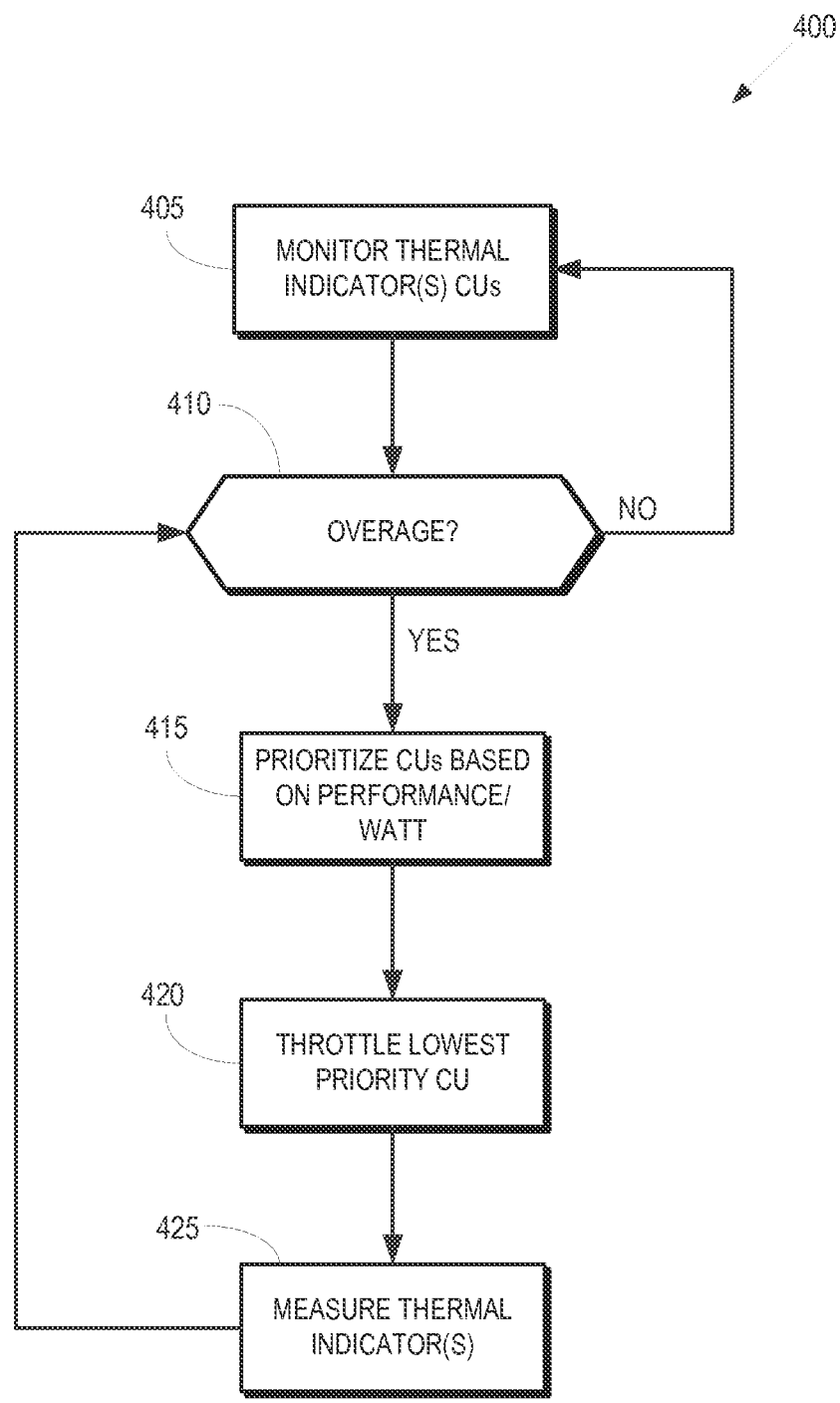
FIG. 4 is a flow diagram of a method for throttling compute units (CUs) on an SOC based on their energy efficiencies, according to some embodiments.

FIG. 4 is a flow diagram of a method 400 for throttling compute units (CUs) on an SOC based on their energy efficiency, according to some embodiments. The method 400 may be implemented in a power management controller such as the power management controller 140 shown in FIG. 1. At block 405, the power management controller monitors one or more thermal indicators associated with the CUs. Exemplary thermal indicators may include temperatures measured at one or more locations proximate the CUs, power supplied to the CUs, and the like. Some embodiments of the power management controller may check the thermal indicators at a predetermined time interval, such as every millisecond, or in response to requests or instructions from software, firmware, or hardware. At decision block 410, the power management controller may determine whether an overage has occurred, e.g., because a temperature and/or a power level has exceeded a corresponding threshold value. As long as no overage is detected at decision block 410, the power management controller may continue to monitor the thermal indicators at block 405. If an overage such as a temperature overage or a power overage is detected at decision block 410, the power management controller may begin throttling one or more CUs.

Throttling the CUs includes prioritizing the CUs based on an energy efficiency of each CU. For example, at block 415 the CUs may be given a relatively high priority when they have a relatively high value of performance/watt and they may be given a relatively low priority when they have a relatively low value of performance/watt. Priorities may be predetermined for each CU and, in some embodiments, they may vary in response to variations in the performance/watt of one or more CUs. The power management controller may then throttle the lowest priority CU at block 420. Throttling may be performed either by applying a lower power budget to the CU or by limiting or reducing the performance state of the CU, e.g., by modifying one or more clock settings, operating frequencies, or operating voltages. Throttling the lowest priority CU may limit the impact on the overall performance of the SOC since the throttled the CU may have the lowest performance/watt of the CUs on the SOC. Some embodiments of the power management controller may use other criteria to determine whether to throttle a CU. For example, the throttling efficiency of the CU, which indicates how much the temperature of the CU may be lowered by throttling the CU, may be considered when deciding whether to throttle the CU. Some embodiments of SOC 100, such as fanless systems, may experience a significant degree of thermal interaction between different CUs. For example, if CU1 is hot and CU0 is relatively cool, throttling CU0 may not reduce the temperature of CU0 if there is a strong thermal interaction between CU1 and CU0. Throttling CU1 or both CU0 and CU1 may be a more effective strategy for reducing the temperature of CU0 in that case.

At block 425, the power management controller may measure the thermal indicators in response to throttling the lowest priority CU. The power management controller may then determine whether the overage has been resolved at block 405. If so, the power management controller may return to normal monitoring of the thermal indicators. If not, the method 400 may be iterated to remove the next lowest priority CU until the overage has been resolved.

Figure 5:
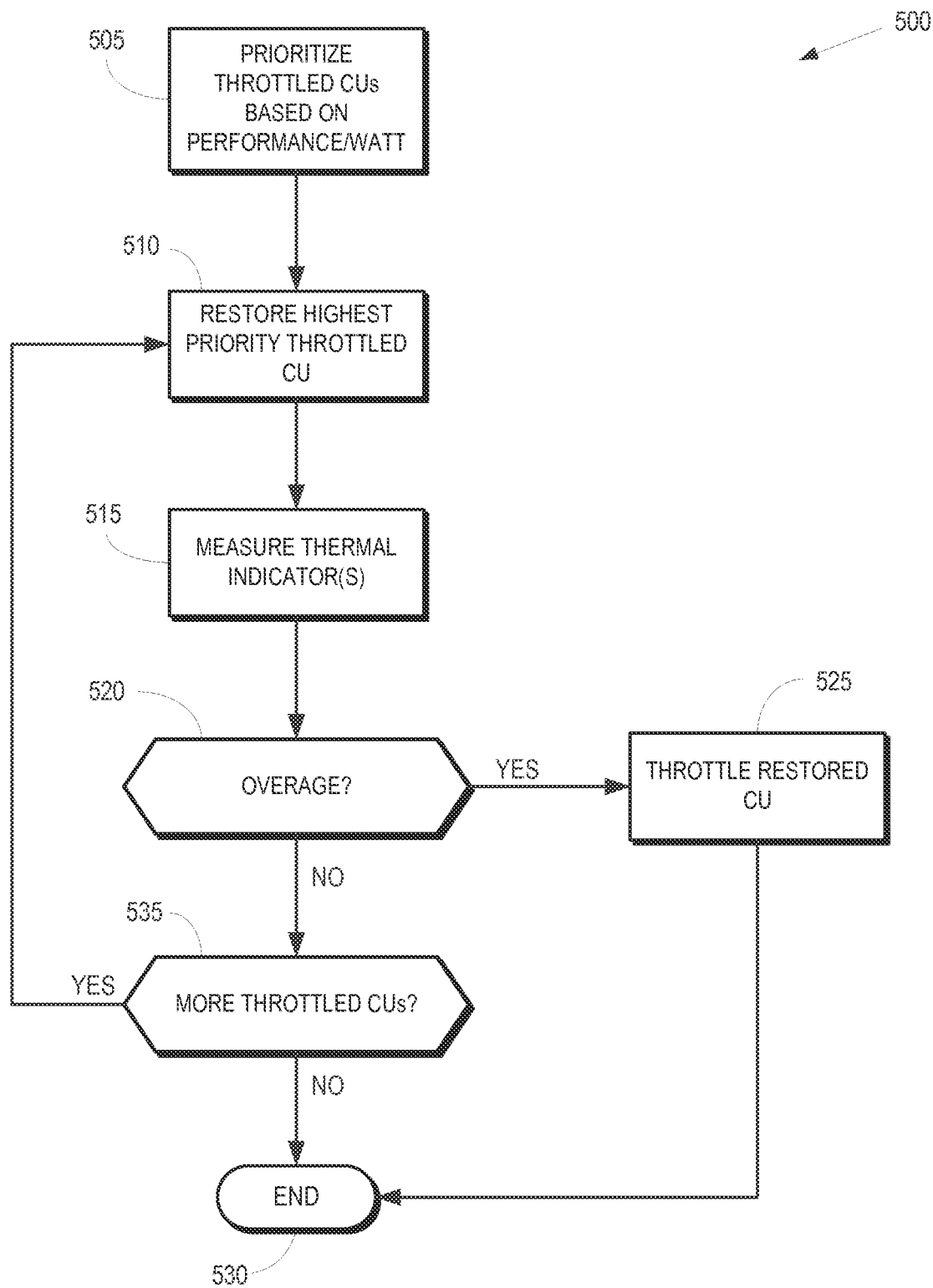
FIG. 5 is a flow diagram of a method for restoring power to throttled compute units (CUs) on an SOC, according to some embodiments.

FIG. 5 is a flow diagram of a method 500 for restoring power to throttled compute units (CUs) on an SOC, according to some embodiments. The method 500 may be implemented in a power management controller such as the power management controller 140 shown in FIG. 1. The method 500 may be initiated in response to a temperature or a power overage being resolved. Resolution of the overage may be detected in response to measured temperatures or powers falling below a threshold value that was used to throttle the CUs, in response to the measured temperatures or powers falling below a lower threshold value to provide a hysteresis between throttling and restoring power, in response to an accumulated energy credit (e.g., the power lost by throttling multiplied by the throttling duration) exceeding a threshold, in response to a predetermined time interval expiring, or in response to other conditions. At block 505, the power management controller prioritizes the throttled CUs. Prioritization may be performed for only the throttled CUs or may be based on a prioritization performed for all of the CUs on the SOC.

At block 510, power is restored to the highest priority throttled CU, e.g., as determined by the priority list 200 shown in FIG. 2. Restoring power to the highest priority throttled CU may be performed by increasing the power budget of the CU or increasing a performance state of the CU. Since the high priority of the throttled CU indicates a high performance/watt, restoring power to the highest priority throttled CU may improve the overall performance of the SOC by the largest amount available among the throttled CUs. At block 515, the power management controller may measure one or more of the thermal indicators associated with the throttled CUs. If the power management controller detects a reoccurrence of the overage at decision block 520, the power management controller may throttle the restored CU and the method 500 may end at block 525. As long as no overage is detected, the power management controller may determine whether there are any more throttled CUs on the SOC at decision block 535. If so, the power management controller may restore the next highest priority throttled CU at block 510. The method 500 may iterate until power is restored to all of the throttled CUs or until a reoccurrence of the overage is detected.

In some embodiments, the apparatus and techniques described above are implemented in a system comprising one or more integrated circuit (IC) devices (also referred to as integrated circuit packages or microchips), such as the processing device 100 described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
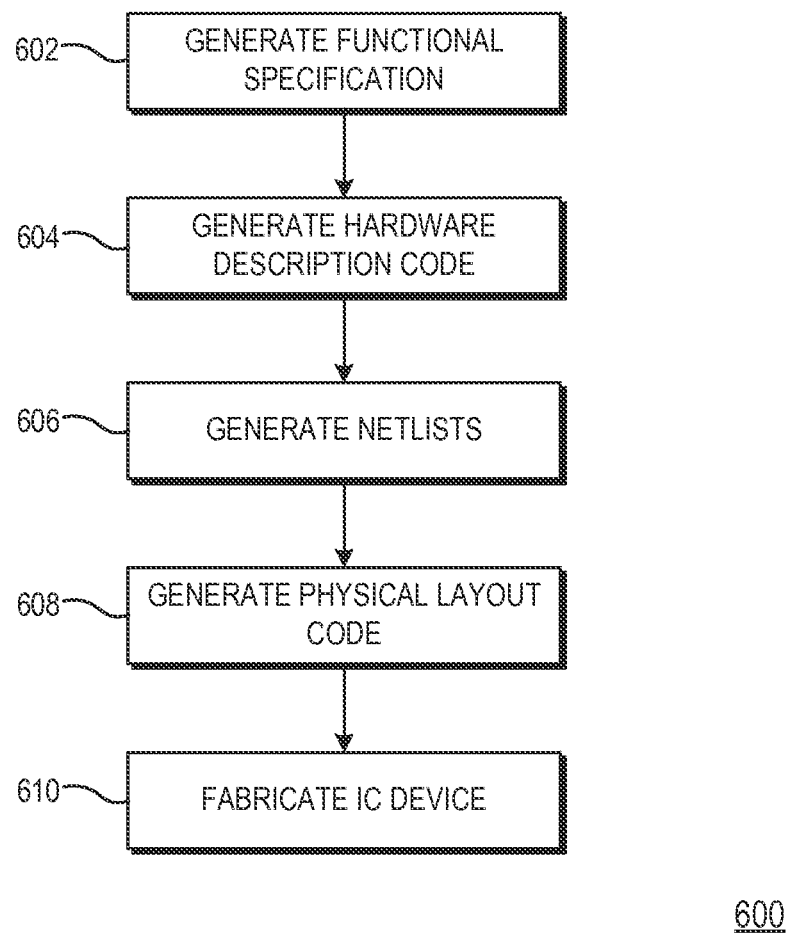
FIG. 6 is a flow diagram illustrating an example method for the design and fabrication of an IC device implementing one or more aspects, according to some embodiments.

FIG. 6 is a flow diagram illustrating an example method 600 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, System-Verilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternately, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

A block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium my be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   allocating portions of a power budget of a system-on-a-chip (SOC) to a plurality of compute units implemented on the SOC based on ratios of a performance level for each compute unit to a power consumed by the compute unit operating at the performance level; and
   throttling a power supplied to at least one of the compute units in response to an indication of an overage of a parameter in the SOC, wherein throttling the power supplied to said at least one of the compute units comprises selecting a compute unit that has a lowest ratio of performance level to power consumption and throttling the power supplied to the selected compute unit.

2. The method of claim 1, wherein allocating the portions of the power budget comprises allocating larger percentages of the power budget to compute units that have larger values of the ratio of the performance level to the power consumed by the compute unit operating at the performance level.

3. The method of claim 1, further comprising:
   determining the performance level for each compute unit by monitoring at least one of an activity of a node register in the compute unit or by monitoring a rate of execution or retirement of operations or instructions in the compute unit.

4. The method of claim 1, wherein the indication of the overage is at least one of a temperature of the SOC exceeding a maximum temperature or a power supplied to the SOC exceeding a maximum power.

5. The method of claim 1, wherein throttling the power supplied to said at least one of the compute units comprises iteratively throttling the power supplied to the compute unit having the lowest ratio of performance level to power consumption until the overage is resolved.

6. The method of claim 5, wherein the overage is resolved when a temperature of the SOC falls below a first threshold, when an accumulated energy credit for said at least one of the compute units exceeds a second threshold, or after a predetermined time interval.

7. The method of claim 5, comprising:
comprising restoring power to said at least one compute unit in response to the overage being resolved.

8. A system-on-a-chip (SOC), comprising:
a plurality of compute units; and
a power management controller to allocate portions of a power budget of the SOC to the plurality of compute units based on ratios of a performance level for each compute unit to a power consumed by the compute unit operating at the performance level, wherein the power management controller is to throttle power supplied to at least one of the compute units in response to an indication of an overage of a parameter to the SOC, and wherein the power management controller is to select a compute unit that has a lowest ration of performance level to power consumption and throttle the power supplied to the selected compute unit.

9. The SOC of claim 8, wherein the power management controller is to allocate larger percentages of the power budget to compute units that have larger values of the ratio of the performance level to the power consumed by the compute unit operating at the performance level.

10. The SOC of claim 8, further comprising:
logic to determine the performance level for each compute unit by monitoring at least one of an activity of a node register in the compute unit or by monitoring a rate of execution or retirement of operations or instructions in the compute unit.

11. The SOC of claim 8, wherein the indication of the overage is at least one of a temperature of the SOC exceeding a maximum temperature or a power supplied to the SOC exceeding a maximum power.

12. The SOC of claim 8, wherein the power management controller is to iteratively throttle the power supplied to the compute unit having the lowest ratio of performance level to power consumption until the overage is resolved.

13. The SOC of claim 12, wherein the overage is resolved when a temperature of the SOC falls below a first threshold, when an accumulated energy credit for said at least one of the compute units exceeds a second threshold, or after a predetermined time interval.

14. The SOC of claim 13, wherein the power management controller is to restore power to said at least one compute unit in response to the overage being resolved.

15. A non-transitory computer readable medium embodying a set of executable instructions, the set of executable instructions to manipulate a computer system to perform a portion of a process to fabricate at least part of a system-on-a-chip (SOC), the SOC comprising:
a plurality of compute units; and
a power management controller to allocate portions of a power budget of the SOC to the plurality of compute units based on ratios of a performance level for each compute unit to a power consumed by the compute unit operating at the performance level, wherein the power management controller is to throttle power supplied to at least one of the compute units in response to an indication of an overage of a parameter to the SOC, and wherein the power management controller is to select a compute unit that has a lowest ration of performance level to power consumption and throttle the power supplied to the selected compute unit.

16. The non-transitory computer readable medium set forth in claim 15, further comprising a set of executable instructions to manipulate the computer system to perform a portion of a process to fabricate at least part of an SOC to:
restore power to said at least one compute unit in response to the overage being resolved.

\* \* \* \* \*